US008778285B2

(12) United States Patent
Hoglund et al.

(10) Patent No.: US 8,778,285 B2
(45) Date of Patent: Jul. 15, 2014

(54) CLAMPING SYSTEM

(75) Inventors: Kasper Hoglund, Rönninge (SE); Magnus Lingvall, Stockholm (SE); Tommy Noren, Veberöd (SE)

(73) Assignee: Alfa Laval Corporate AB, Lund (SE)

( * ) Notice: Subject to any disclaimer, the term of this patent is extended or adjusted under 35 U.S.C. 154(b) by 158 days.

(21) Appl. No.: 12/993,378

(22) PCT Filed: May 5, 2009

(86) PCT No.: PCT/SE2009/050485
§ 371 (c)(1),
(2), (4) Date: Feb. 16, 2011

(87) PCT Pub. No.: WO2009/142579
PCT Pub. Date: Nov. 26, 2009

(65) Prior Publication Data
US 2012/0269704 A1 Oct. 25, 2012

(30) Foreign Application Priority Data
May 21, 2008 (SE) ........................................ 0801181

(51) Int. Cl.
*B01L 9/00* (2006.01)
(52) U.S. Cl.
USPC .......................................... 422/560; 422/566
(58) Field of Classification Search
USPC .................................................. 422/560, 566
See application file for complete search history.

(56) References Cited

U.S. PATENT DOCUMENTS

| | | | |
|---|---|---|---|
| 1,972,379 A | 9/1934 | Feldmeier | |
| 2,015,819 A | 10/1935 | Seligman et al. | |
| 2,221,937 A | 11/1940 | Astle | |
| 2,405,256 A | 8/1946 | Jack et al. | |
| 2,582,871 A | 1/1952 | Kintner | |
| 2,677,531 A | 5/1954 | Hock, Sr. et al. | |
| 4,584,751 A | 4/1986 | Gray et al. | |
| 4,776,387 A | 10/1988 | Newman | |
| 4,901,414 A | 2/1990 | Breda et al. | |
| 5,462,112 A | 10/1995 | Johansson | |
| 7,189,468 B2 | 3/2007 | Izenson et al. | |
| 8,161,997 B2 | 4/2012 | Hoglund et al. | |
| 2003/0116305 A1 | 6/2003 | Beddome et al. | |
| 2004/0188060 A1 | 9/2004 | Finch et al. | |
| 2004/0224213 A1* | 11/2004 | Dristy | 429/37 |

FOREIGN PATENT DOCUMENTS

| | | |
|---|---|---|
| EP | 0043113 A2 | 1/1982 |
| JP | 49-024026 B | 6/1974 |
| JP | 64-220 Y2 | 4/1985 |

(Continued)

OTHER PUBLICATIONS

Office Action in corresponding Taiwan Patent Application No. 098114950 dated May 10, 2013.

(Continued)

*Primary Examiner* — Natalia Levkovich
(74) *Attorney, Agent, or Firm* — MKG, LLC

(57) ABSTRACT

The present invention relates to a clamping system comprising two or more grids of springs in a flow module or in a plate reactor. The invention also relates to methods for opening and closing a clamping system, a frame arrangement, a control system for pressure release, and a use of the clamping system as a plate reactor.

16 Claims, 18 Drawing Sheets

(56) References Cited

FOREIGN PATENT DOCUMENTS

| | | |
|---|---|---|
| JP | 09-127527 A | 5/1997 |
| JP | 10-138660 A | 5/1998 |
| JP | 2001-276943 A | 10/2001 |
| JP | 2005-131763 A | 5/2005 |
| JP | 2008-036650 A | 2/2008 |
| WO | 95/10746 | 4/1995 |

OTHER PUBLICATIONS

PCT International Search Report for corresponding PCT Application No. PCT/SE2007/001042 dated Mar. 5, 2008.
PCT International Search Report for corresponding PCT Application No. PCT/SE/2009/050485 dated Sep. 18, 2009.
Notice of Inquiry from corresponding Japanese Application No. 2011-510460, dated Oct. 29, 2013.

* cited by examiner

CLAMPING SYSTEM

CROSS-REFERENCE TO RELATED APPLICATION

This application is a national stage application of PCT Application No. PCT/SE2009/050485, filed May 5, 2009 and which claims priority to Swedish Patent Application No. SE 0801181-9, filed May 21, 2008, which are hereby incorporated by reference in their entirety.

FIELD OF THE INVENTION

The present invention relates to a clamping system comprising two or more grids of springs in a flow module or in a plate reactor. The invention also relates to methods for opening and closing a clamping system, a frame arrangement, and a control system for pressure release.

BACKGROUND

Flow modules or reactors, which comprise plates stacked together and with plates manufactured in materials having large differences in thermal expansion and low modulus of elasticity, operates over a wide temperature range. The large difference in thermal expansion and low modulus of elasticity of the materials of the plates, compared to framework, screws, tension rods and end plates etc. can cause damage or leakage. Thus, one problem is to keep the tension over the whole construction within limits over the whole temperature range without causing leakage or damage on any of the parts in the module or reactor.

Another problem when working with plates is to distribute contact pressure as equal as possible over the plates to prevent unevenness and thus leakage or damaging any of the stacked plates.

SUMMARY OF THE INVENTION

Accordingly, the present invention is directed in one aspect to a solution to this whereby plates are placed between grids of springs. A grid of springs is often called a Winkler bed. By this solution can the tension rods be kept tensioned within acceptable limits. By this solution the clamping forces can be evenly distributed over the whole plate area of the stacked plates instead of being localised along the edges of the plates. The bending stiffness of the end plates will be less important in the flow module or the plate reactor. A further advantage is that by measuring the compression of the springs it is possible to monitor and control the clamping forces. The force on the package of plates can be indirectly measured by measuring the deflection of each spring.

By selecting a spring rate, which is significantly lower than the stiffness of the surrounding structure, the clamping force distribution can remain valid independently of the load distribution on the surrounding structural components, and it is possible to have different forces in each spring if desired.

To make the flow module or the reactor seals work properly, the clamping forces have to be within a proper range. The spring force F is a function of the spring length L. The spring length will vary within the range from $L_{max}$ to where $L_{max}$ is defined as the free length the spring is unloaded, and $L_{min}$ is defined as the spring length at maximum compression. The maximum force $F_{max}$ is defined as spring force at maximum compression of the spring, and the spring force will therefore vary between 0 and $F_{max}$. The spring force $F_x$, which corresponds to $L_x$, has to be larger than force $F_1$ to make sure that no leakage will occur but the spring force should not be bigger than force $F_2$ to not risk permanent deformations. $F_1$ and $F_2$ correspond to spring lengths $L_1$ and $L_2$, respectively, and $L_1 < L_x < L_2$. By using springs or piles of springs, with an adequate force compression curve, a sufficient working range $L_2$ to $L_1$ can be achieved. The range $L_2$ to $L_1$ must be bigger than other geometric discrepancies from manufacturing, assembly and operation. Such discrepancies can for example be manufacturing tolerances on flatness and thickness, or deformations originating from forces at assembly, or dimensional changes due to thermal expansion or material creep at operation.

Accordingly, the present invention relates to a clamping system comprising two end plates, disc springs, and tension rods. Piles of disc springs are arranged as a first grid of springs on one of the two end plates, and the disc springs are supported on this first end plate. One or more modules are placed between the two end plates of the clamping system. Each of the mentioned modules comprises of one or more devices selected from the group consisting of flow plates, reactor plates, heat exchanger plates, intermediate plates, Peltier element, barrier plates, insulating plates, seals, gaskets etc. The flow modules may comprise other devices not mentioned here. Preferably the flow modules comprise one or more plates selected from the group consisting of channel plates, flow plates, reactor plates, utility plates, heat exchanger plates, inter mediate plates, insulating plates. Channel plates are plates defined as plates having a channel connected to inlets and outlets. Utility plates are plates defined as plates having turbulator inserts for enhancing heat transfer to and from the channel of the channel plates, the flow plates, or the reactor plates. Opposite to the first end plate is the second end plate. On this second end plate are further piles of disc springs placed as a second grid of springs. Both end plates are connected by tension rods. The tension rods distribute tension forces to the piles of discs springs when the clamping system is in a closed position. The arrangement or springs supported on the endplates distributes the clamping forces of the system to the modules in between the end plates. Two or more tension rods may be arranged along the circumference of the plates. The tension rods may be screwed or tightened together to compress the springs to length $L_x$, which is $L_x > L_{min}$ and $L_x < L_{max}$. The tightening of the arrangement may be accomplished manually or by aid of an actuator depending on the arrangement. The tension rods may be tightened synchronously or consecutively in small steps according to a tightening scheme. The tension rods may have a fixed length or may have a modular length to set several predefined fixed lengths. The predefined length may correspond to one plate, two plates up to any number of plates or modules. The modular length may be achieved by combining one or more of the predefined tension rod lengths. The fixed length at least defines a thickness of one plate or defining total thickness of several plates. According to another alternative may the tension rods be mechanical jacks or roller screws.

The clamping system can also comprise one or more additional grids of disc springs forming spacer plates placed between two or more flow modules, wherein each spacer plate comprises a grid of springs, a flex plate, and a cover plate, which cover plate is covering the grid of springs and the flex plate.

According to an alternative one or more additional grids of disc springs form spacer plates. These spacer plates are placed between one or more additional modules of flow plates, of reactor plates, of heat exchanger plates, of intermediate plates, of Peltier element, of barrier plates, of insulating plates, of seals, of gaskets or combinations thereof according to one alternative of the present invention. The seals or gaskets may seal flow channels in the flow plates, in the heat exchanger plates, in the intermediate plates or in the reactor plates, but seals may also seal end plates and/or spacer plates. Each spacer plate comprises a grid of springs, a flex plate, and a cover plate. The cover plate covers the grid of springs on the flex plate. The flex plate supports plies of disc springs so that they form a grid of springs.

On the second end plate are springs of the second grid of springs supported by a flex plate. According to one alternative of the present invention a gasket seals a space between the second end plate and the flex plate. The second grid of springs is positioned in this space.

In the clamping system the plies of disc springs of the first grid of springs could be thread on pistons or placed on screws on the first end plate. The pistons or the screws are guided through holes in the first end plate. The spring arrangement, i.e. a grid of spring piles, can suitably be integrated in an end plate according to one alternative, but the grid of springs may also be on top of a flex plate or on top of an end plate. The springs may be integrated with the end plate and piled into holes in the end plate and/or the springs may be arranged to the end plates by pistons or screws going through the end plate. The piles of disc springs can be arranged to receive the most favourable spring force F. The springs may be any type of suitable springs even though disc springs are mentioned here. According to one alternative the clamping system may contain different types of springs in the different grids of springs there may be one type of springs at the end plates and another type of spring in the spacer plates. Examples of suitable springs are helical springs, wave spring washers etc. One or more pressed perforated plates having corrugated waves in one or two directions may also be suitable.

One or more screws may be employed to tension the piles of disc springs on the first end plate. The clamping system could also include tension rods in the form of motor driven mechanic jacks or motor driven roller screws or tensioned by hydraulic actuators.

The clamping system according to the present invention may comprise at least two tension rods, at least two grids of springs, two end plates, one or more distribution plates, one or more pressure plates, wherein the grids of springs comprise piles of disc springs, and wherein the clamping system optionally has one or more additional grids of disc springs forming spacer plates, which spacer plates are placed between two or more flow modules, wherein each spacer plate comprises a grid of springs. The clamping system could comprise distance blocks.

The modules may also comprise intermediate plates etc. which plates can have inserted elements or integrated elements with flow channels, Peltier element, plates with depressions, channels or grooves, elements with cut through area or cut through channels. The plates can also be barrier plates, insulating plates, combinations of plates either integrated or separate.

The present invention relates also to a method for opening or closing a clamping system having one or more flow modules comprising the following steps: step (i) compressing an arrangement of springs to a length $L_x > L_{min}$; step (ii) placing a stack of one or more flow modules between the compressed arrangements of springs and end plates or removing one or more flow modules; step (iii) tightening the tension rods and connecting the two endplates, to a length A defined as the total length between two end plates predefined by the length of the tension rods or loosening the tension rods and disconnecting the end plates; and step (iv) releasing the compression of the arrangement of the springs.

An alternative method of the invention for opening or closing the clamping system having one or more flow modules comprises step (i) placing one or more flow modules between the non-compressed arrangement of springs and end plates or removing one or more modules; step (ii) compressing an arrangement of springs to a length $L_x > L_{min}$; step (iii) placing distance blocks between one end plate and a distribution plate in a frame to set the distance A or removing the one or more modules when opening the clamping system; and step (iv) releasing the compression of the arrangement of the springs.

The method according to both alternatives may also comprise a step (v) in which length $L_x$ is measured for each spring for control of spring force $F_x$. The both methods may also comprise that the compressing in step (i) and the release of the compression in step (iv) are aided by hydraulic cylinders or by an electro-mechanical or mechanical actuator.

The present invention also relates to a method for closing a flow module or closing a plate reactor or closing a clamping system having one or more modules, which modules comprises one or more flow module plates, or one or more reactor plates, or one or more heat exchanger plates, or combinations thereof. The closing method comprises the following steps: (i) compressing arrangements of springs in the clamping system according to the invention, wherein the arrangements of springs are compressed to a length $L_x > L_{min}$ between two end plates; (ii) placing one or more modules between the compressed arrangements of springs and end plates; (iii) tightening the two end plates to a length $A > (L_{min} + $total thickness of the stack of modules); (iv) releasing the compression of the arrangements of the springs.

The invention also relates to another method for closing a flow module or closing a plate reactor or closing a clamping system having one or more modules, which modules comprises one or more flow module plates, or one or more reactor plates, or one or more heat exchanger plates, or combinations thereof. The clamping system can also comprise one or more distance blocks or one or more distribution plates or one or more pressure plates or combinations thereof. This alternative closing method comprises the following steps: (i) placing one or more modules between non-compressed arrangements of springs and end plates; (ii) compressing the arrangements of springs in a clamping system, according to the invention, to a length $L_x > L_{min}$; (iii) placing distance blocks between one end plate and one distribution plate to set length $A > (L_{min} + $total thickness of the stack of modules); and (iv) releasing the compression of the arrangements of the springs.

The present invention also relates to a method for opening a flow module or opening a plate reactor or opening a clamping system having one or more modules, which modules comprise one or more flow module plates, or one or more reactor plates, or one or more heat exchanger plates, or combinations thereof. This alternative opening method comprises the following steps: (i) compressing arrangements of springs in a clamping system according to the invention, wherein the arrangements of springs are compressed to a length $L_x > L_{min}$ or to a length that one or more modules, can be removed; (ii) removing one or more modules; (iii) releasing the compression of the arrangements of the springs.

The invention relates also to an alternative method for opening a flow module or opening a plate reactor or opening a clamping system having one or more modules, which modules comprises one or more flow module plates, or one or more reactor plates, or one or more heat exchanger plates, or combinations thereof. This alternative opening method comprises the following steps: (i) compressing arrangements of springs in a clamping system according to the invention to a length $L_x > L_{min}$; (ii) displacing distance blocks from between one end plate and one distribution plate; (iii) releasing the compression of the arrangements of the springs; and removing one or more modules from the frame.

The methods for opening or closing may also comprise a step (v) in which length $L_x$ is measured for each spring for control of spring force $F_x$ when the flow module, the plate reactor or the clamping system being closed. The method may also comprise that the compressing step and the release of the compression step are aided by hydraulic cylinders or by an electro-mechanical or mechanical actuator.

According to an alternative of the method the tension rods may be tightened simultaneously and synchronously until the correct length $L_X$ is set. This could be done by using mechanical jacks or roller screws as tension rods with an actuator. When the correct $L_X$ is reached must the mechanic jacks or the roller screws and nuts be locked. The actuator may be an electric motor, a hydraulic motor or any other type of motor. The synchronisation may be done by aid of a mechanical transmission or by controlling individual actuators.

The present invention also relates to use of a clamping device or system to compensate for temperature expansion of a stack of one or more flow module plates, one or more reactor plates, one or more heat exchanger plates, or combinations thereof between two end plates. The present invention relates further to a use of a clamping device for opening or closing of a flow module or of a plate reactor.

When there is an increase of pressure within the flow module or the plate reactor any kind of pressure sensor sends a signal to a control unit according to one alternative of the invention. The control unit may be connected to an actuator of hydraulics, cylinders, mechanic jacks, or roller screws, which hydraulics are connected to the clamping device. When the pressure reaches a critical level or a predefined value the control unit forces the actuator to open the flow module or the plate reactor to release the pressure.

The present invention also relates to a reactor frame arrangement or a flow module frame arrangement comprising a clamping system comprising two end plates, disc springs, and tension rods, distribution plates, pressure plates, wherein piles of disc springs are arranged as a first grid of springs on one of the two end plates, and the disc springs are supported on this first end plate, on the second end plate opposite to the first endplate, are further piles of disc springs placed as a second grid of springs, and wherein the clamping forces are redistributed by addition of material or by removal of material to define a contact pattern in the interface between a pressure plate and a distribution plate. One or more vertical grooves could be milled in at least one of the distribution plates or in at least one the pressure plates or both creating two or more vertical lines of contact in all its length in each plate. Instead of grooves could vertical cut outs define the contact pattern, or additional plates or bar plates or any suitable longitudal form could define the contact pattern. The contact pattern improves the distribution of the clamping forces.

In the following will the invention be explained by the use of FIGS. 1 to 20. The figures are for the purpose of demonstrating the invention and are not intended to limit its scope.

DETAILED DESCRIPTION

Figure 1:
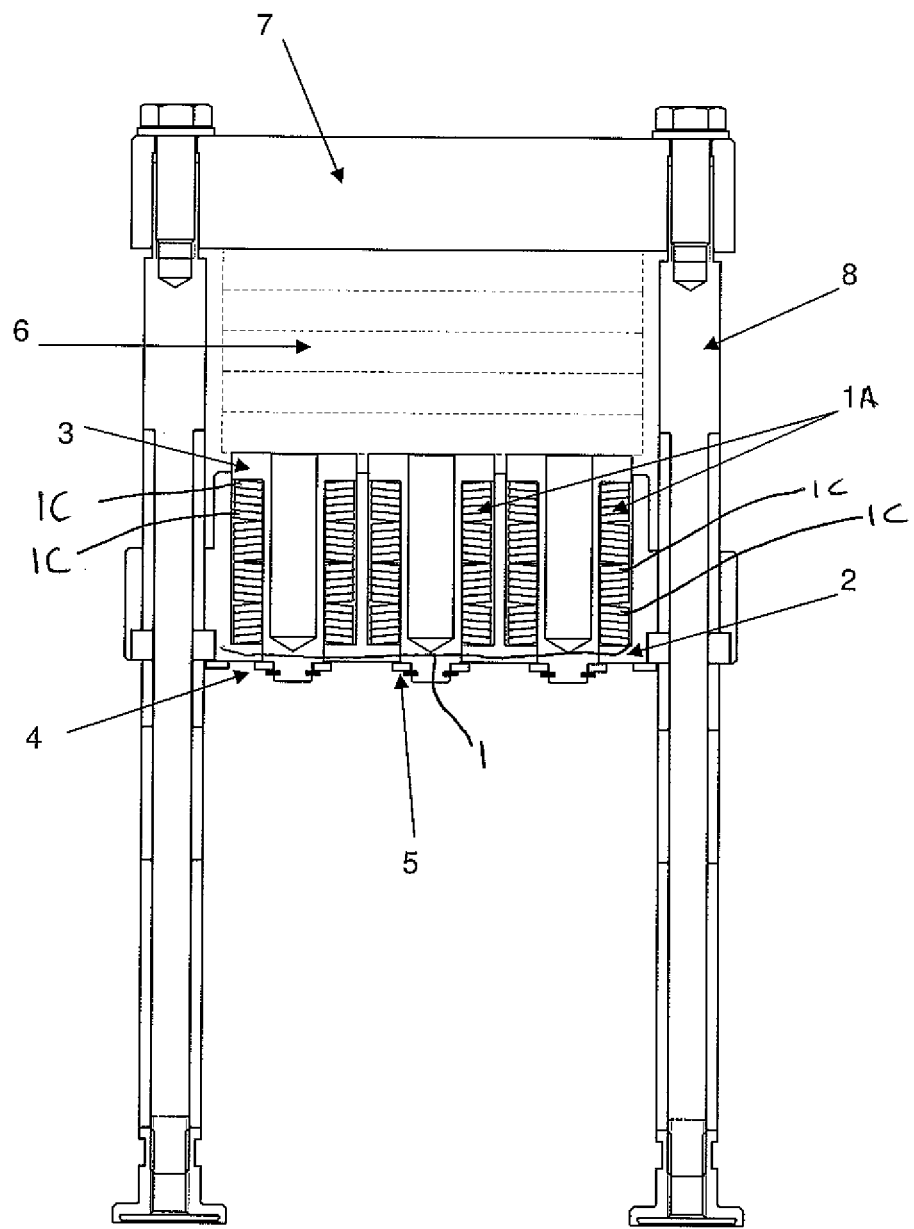
FIG. 1 illustrates a cross section view over a grid of springs supported on a first end plate according to one alternative of the invention.

FIG. 1 illustrates a cross sectional view over a first grid of springs 1 supported on a first end plate 2. In this figure the springs are piles of disc springs arranged to get the adequate length and force to be able to seal the reactor or flow module. Each pile of disc springs are threaded onto a piston 3, which is locked on the opposite side of end plate 2 with a washer 4 and a retaining ring 5. Reactor plates 6, or flow plates 6 are substantially sealed by the aid of an end plate 7 and tension rods 8. The tension rods may have a fixed length or may be modular, to set several, predefined fixed lengths, which could correspond to the length of one, two or more plates, and each modular tension rod may be composed of the different combinations to be as flexible as possible, thus one set of modular tension rods may be use for a single plate or for couple of plates or for several plates depending on how the modular tension rods are arranged for the specific application. According to this embodiment the closing of the plate reactor or the flow module is achieved by screwing together the two end plates with the grid of springs, the plates and the tension rods. When the equipment is closed or sealed the clamping force may be measured by measuring the distance between the end plate and the ends of the spring pistons.

Figure 2:
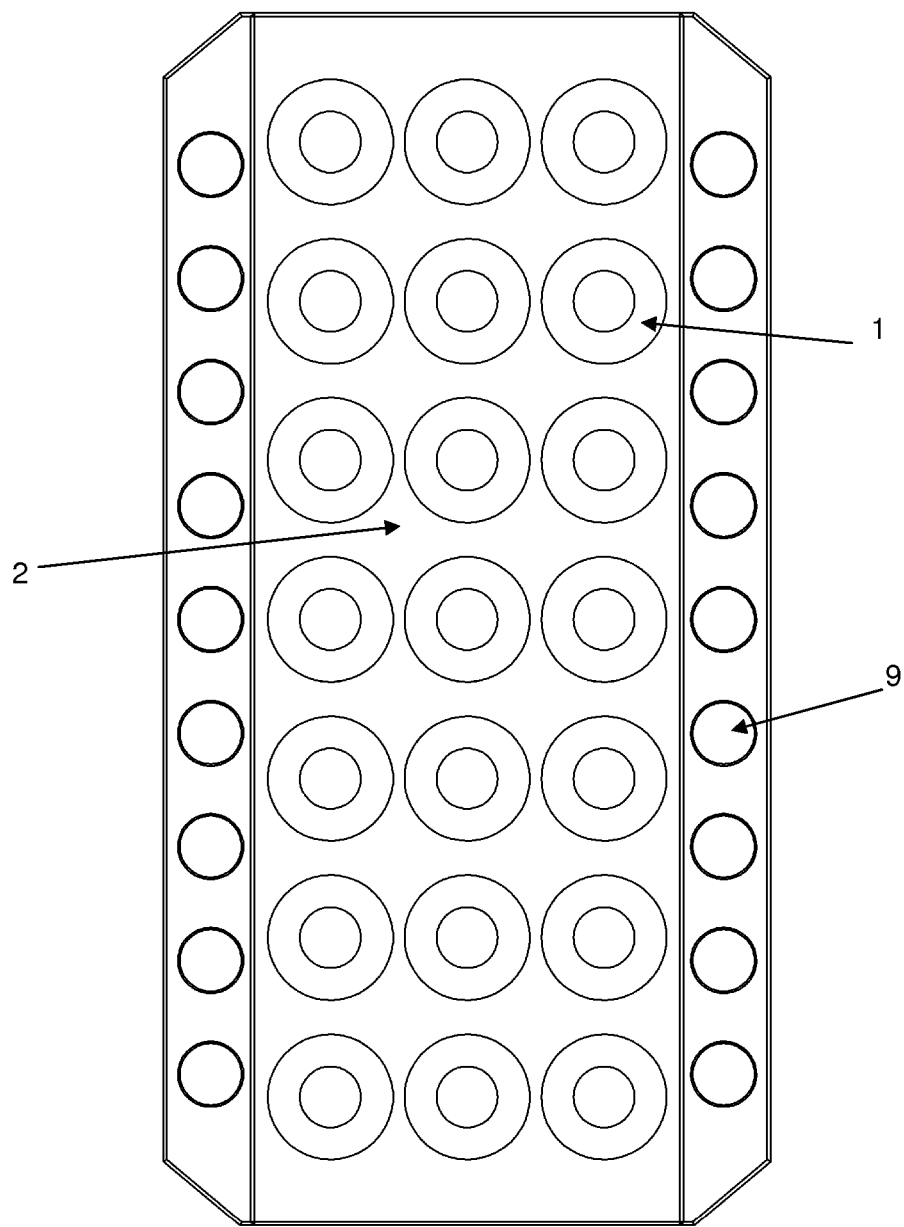
FIG. 2 illustrates a top view of a grid of springs according to one alternative of the invention.

FIG. 2 shows a top view of a grid of springs according to an embodiment of the invention. In this figure piles of disc springs 1 form a 3×7 grid of springs on an end plate 2. Along the long sides of the end plate are holes 9 for fixing the tension rods 8 to screws, which are not seen in this figure, when closing the assembly. One way of closing the assembly is to apply a grid of spring piles distributed over the plate, as shown in FIG. 2, where everything is screwed together by tension rods along the circumferential of the plates. The rods are tightened evenly until the deflection of each spring pile is correct.

Figure 3:
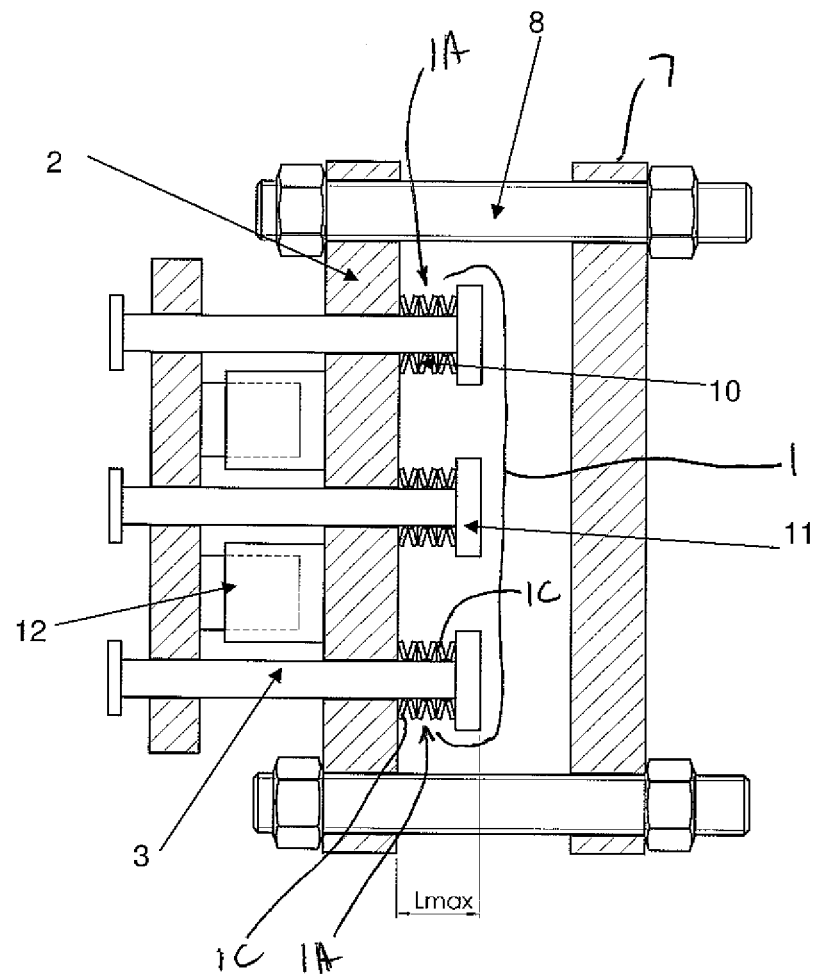
FIG. 3 illustrates a side section view of a non-compressed grid of springs having length $L_{max}$.
Figure 4:
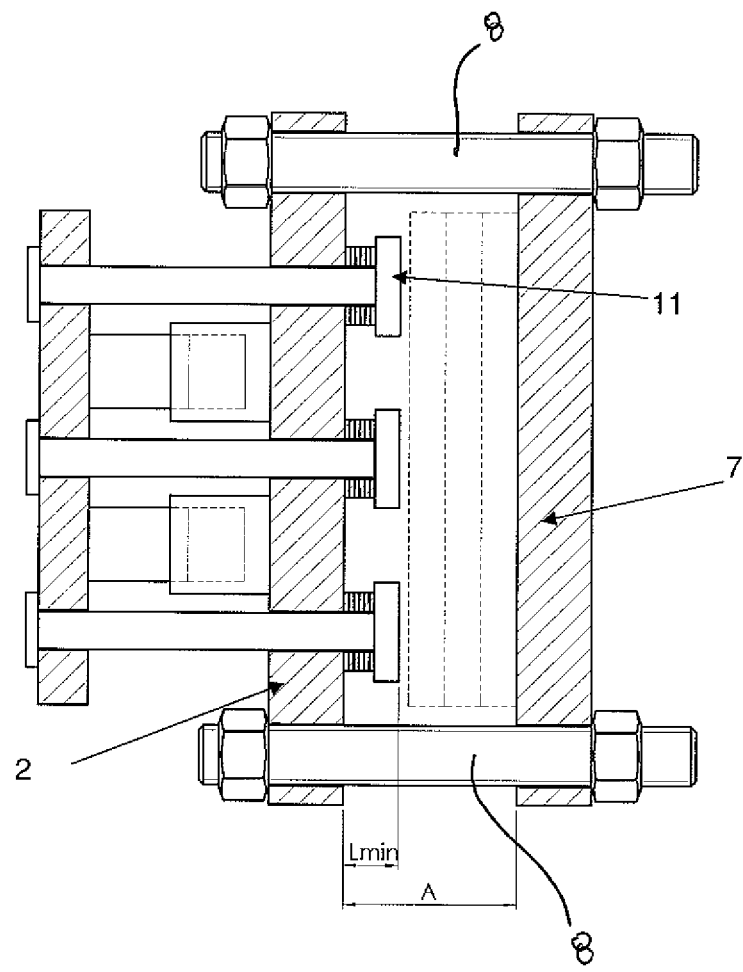
FIG. 4 illustrates a side section view of a compressed grid of springs having length $L_{min}$, the figure is also defining length A.
Figure 5:
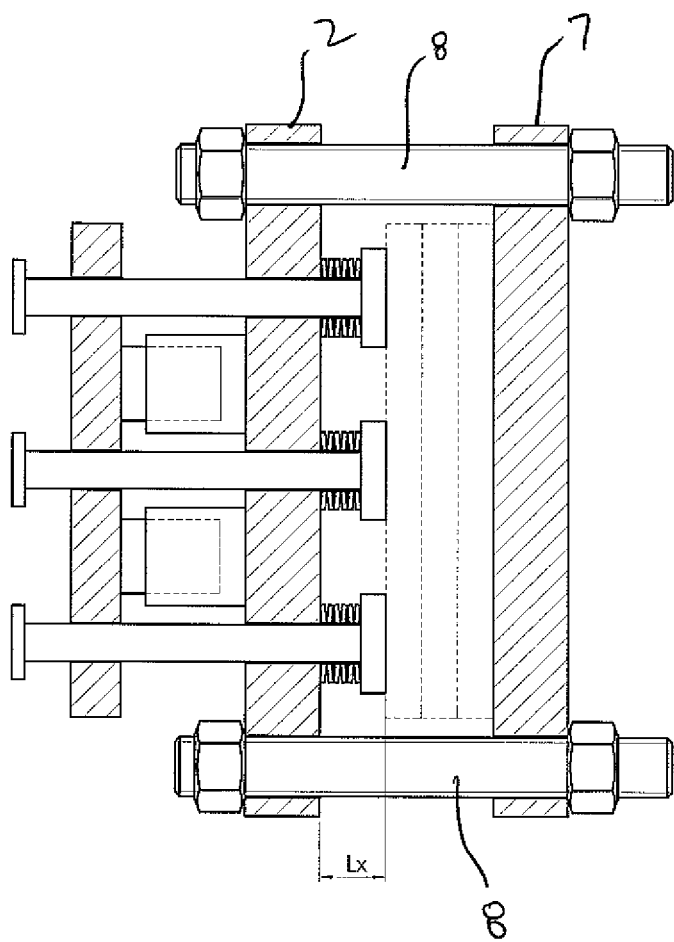
FIG. 5 illustrates a side section view of a grid of springs having length $L_x$ and how the springs are creating a sealing force of the flow module or the plate reactor.

In FIG. 3 a non-compressed grid of springs 10 having length $L_{max}$ of the springs is shown, and the springs are thread onto pistons 3. In this figure a constant is added to the length of the springs, the constant is equal to the thickness of heads 11 of pistons 3. The figure is also showing hydraulic cylinders 12, which can be used for closing and opening of the reactor or the flow module. When the flow module or the reactor is open the springs are compressed by hydraulic cylinders to a length $L_{min}$, which can be seen in FIG. 4. To length $L_{min}$, in this figure is the same constant as in FIG. 3 added. Flow plates, reactor plates, heat exchanger plates, or combinations thereof are placed between heads 11 and end plate 7, and the plates are put into place and the nuts are tightened until the clamping length is A. Clamping length A is defined as the total length between the two endplates 2 and 7. In FIG. 5 it can be seen how the flow module or the reactor is closed. When the hydraulics are released then the plates are clamped. To control the forces $F_x$, length $L_x$ is measured for each spring pile. The length of the springs is $L_x$ plus the same constant as in FIG. 3. Length $L_x$ correspond to spring force $F_x$, which is acting on the flow module or the reactor. Length $L_X$ changes depending on the temperature. The large difference in thermal expansion and low modulus of elasticity of the materials of the plates, compared to framework, screws, tension-rods and end plates etc. is thus compensated for by the grid of springs which gives the assembled reactor or flow module a flexibility and damages or leakage can be prevented.

Figure 6:
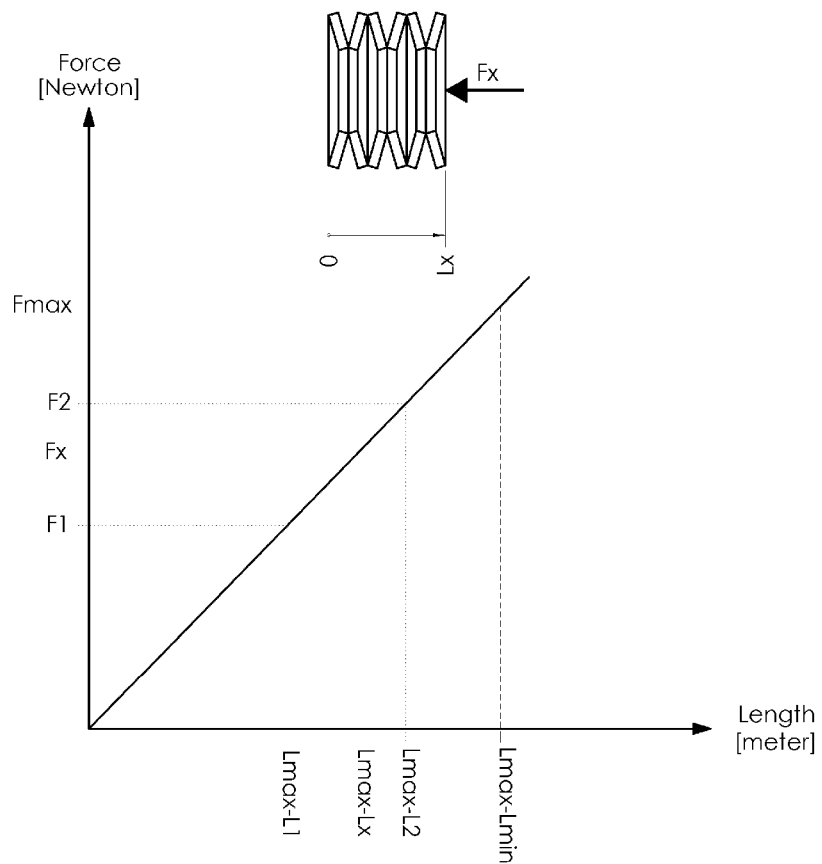
FIG. 6 illustrates a diagram of the function between spring force and length of the springs.

FIG. 6 shows a diagram of the function between spring force and length of the springs. By measuring the spring lengths of the grid of springs it is possible to approximate the force for each length by use of the diagram.

The diagram of FIG. 6 is exemplified in Example 1, which example is for the purpose of illustrating the function between force and spring length, and is not for limiting the scope of invention.

Figure 7:
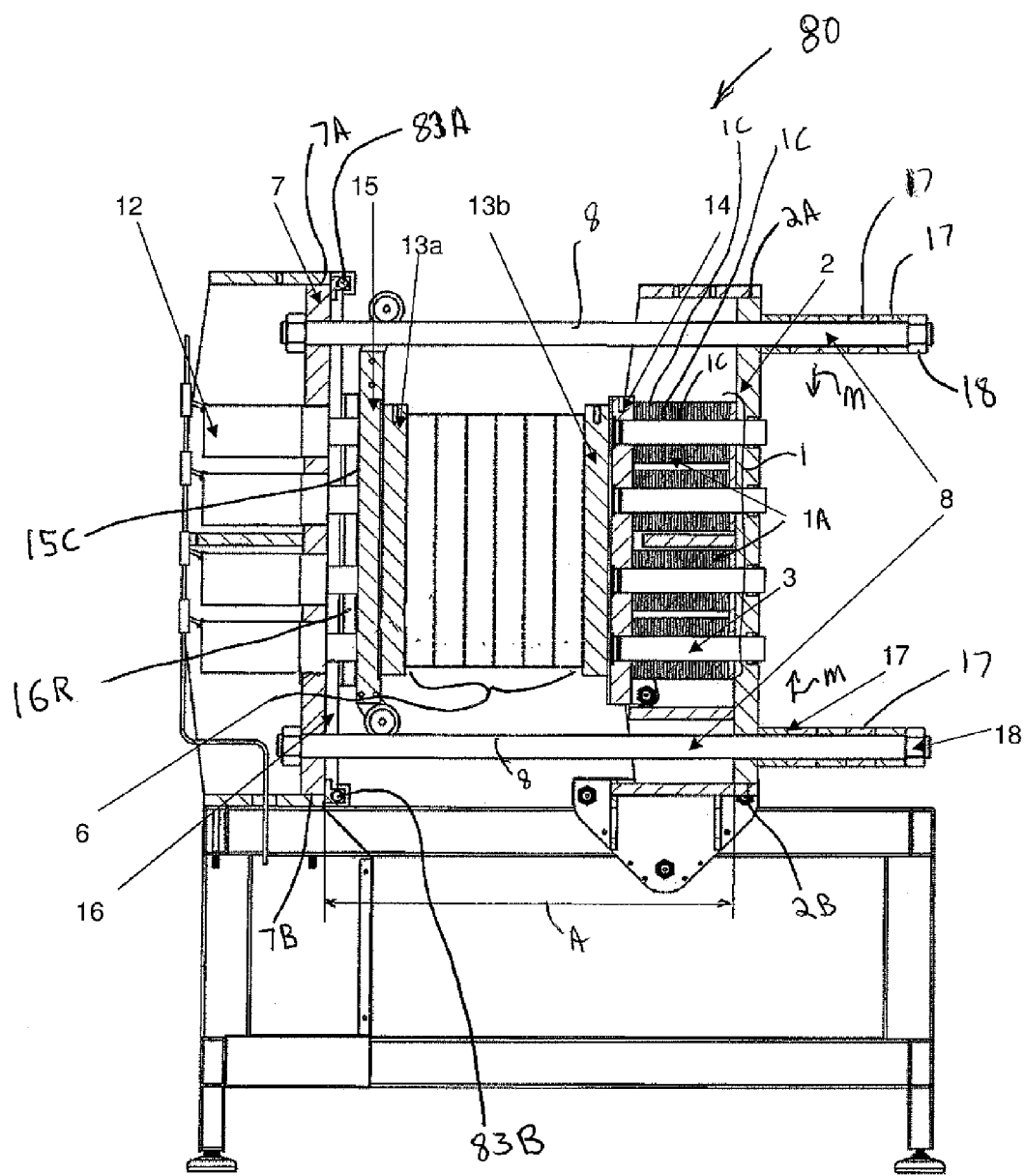
FIG. 7 illustrates an alternative embodiment of the invention having a frame, which comprises two tension rods and two end plates, which frame is holding the reactor plates or the flow module plates into place by aid of a grid of springs. Hydraulics are used for opening and closing.

FIG. 7 shows another alternative of the invention wherein a frame holds the reactor plates 6 or the flow module pates 6 in place. The plates are kept in place by the force from the grid of springs and the end plates. According to this alternative of the invention distribution plate 15, and pressure plates 13a and 13b are placed between the two end plates and the reactor plates 6 or the flow module plates 6. Two distance blocks 16 are placed between end plate 7 and distribution plate 15. The distance blocks are in closed position in this figure, which can be seen in the figure where the distance blocks are placed between the end plate and the distribution plate, which is not the case when the distance blocks are in open position. The forces from hydraulic cylinders 12 can be released so that plates 6 are kept into place without the aid of hydraulic cylinders 12. The force on plates 6 can be measured by measuring the distance between end plate 2 and how far pistons 3 have reached outside end plate 2, see also FIG. 10. The two end plates 2 and 7 are positioned so that the intended number of plates 6 can be entered between them when in open position. The distance between the two end plates may be adjusted by choosing the number of sleeves 17 and tightening of nuts 18 on each tension rod 8.

Figure 8:
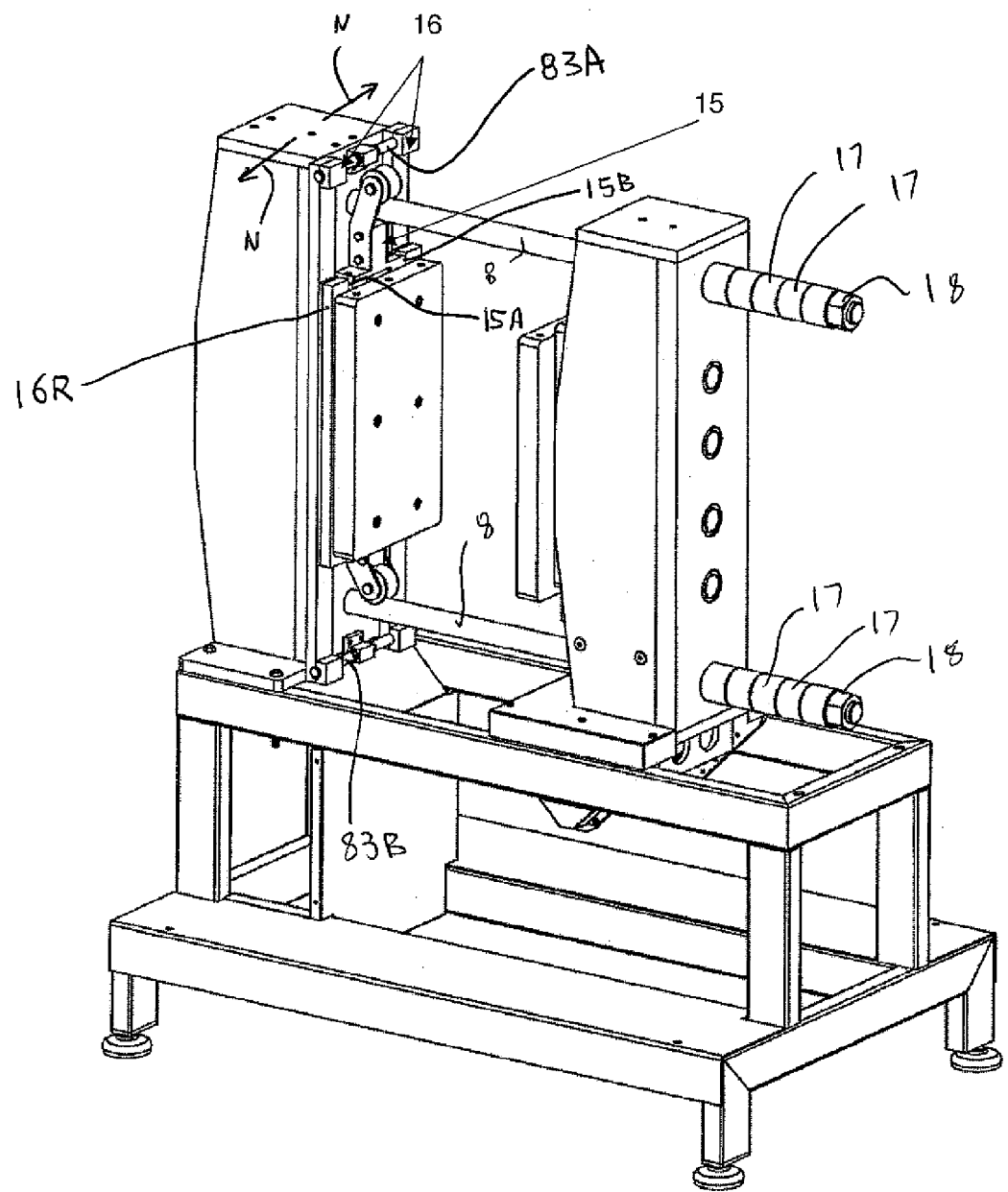
FIG. 8 illustrates the same embodiment as in FIG. 7, wherein the distance blocks are in the open, or unclamped, position.
Figure 9:
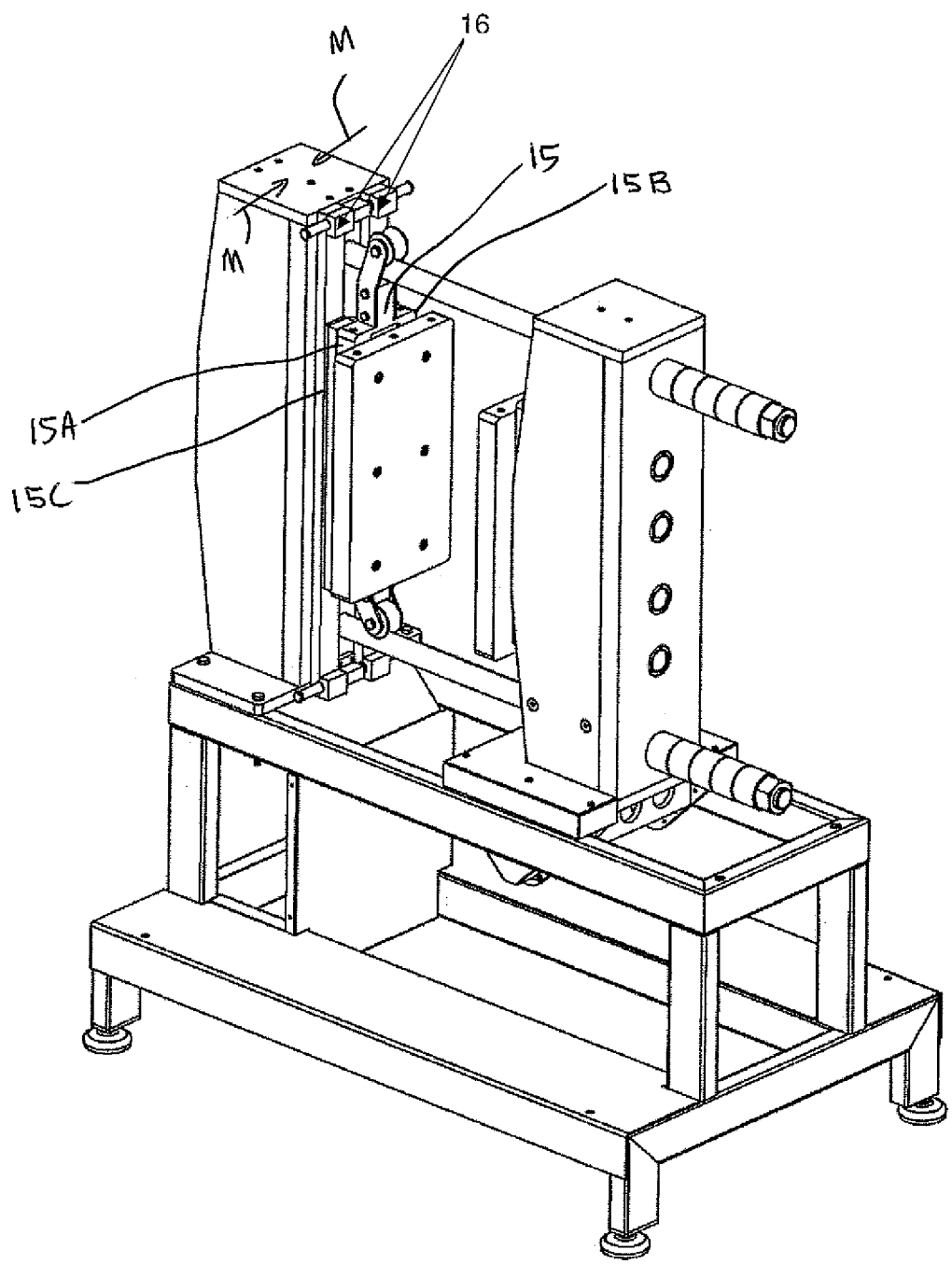
FIG. 9 illustrates the same view as FIG. 8 of the frame with the distance blocks in the closed, or clamped position.
Figure 10:
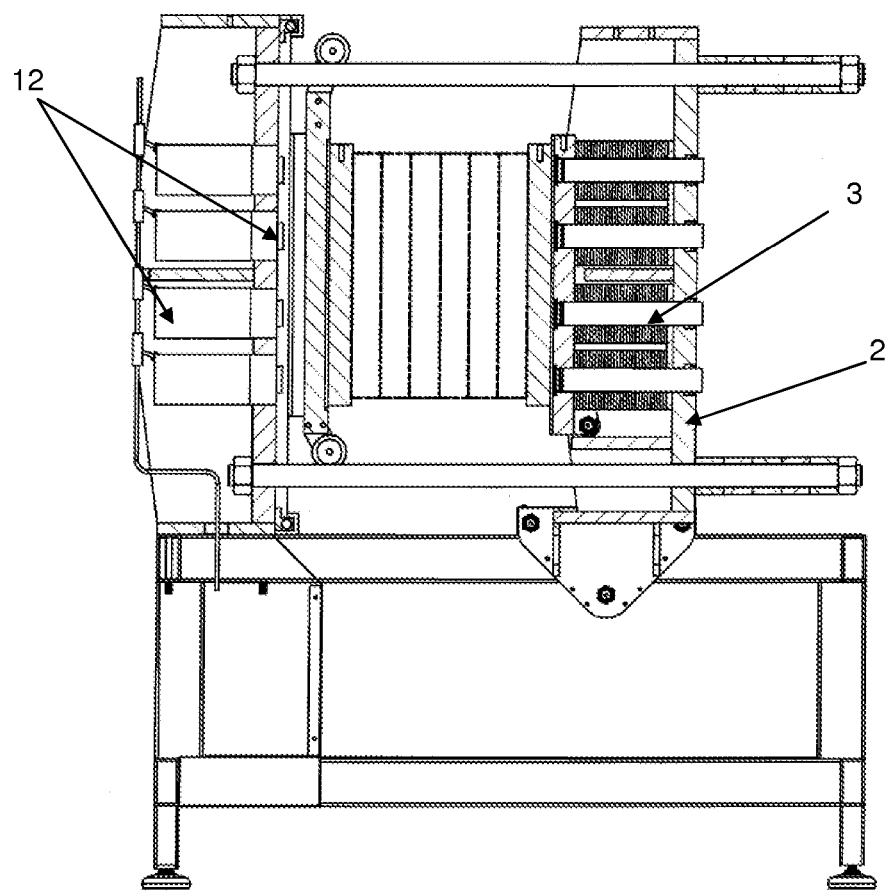
FIG. 10 illustrates a side section view of the same embodiment as in FIG. 7, in which the distance blocks are in the clamped position and the hydraulic cylinders are released.

FIG. 8 is showing the distance blocks in open position. The open position is when each block is placed on the outer sides of distribution plate 15. FIG. 9 is showing the distance blocks in closed position. When the reactor or the flow module is closed distance blocks 16 are behind distribution plate 15. In FIG. 10 hydraulic cylinders 12 are released from pressure with the distance blocks placed behind the distribution plate holding the reactor or flow module in closed position.

Figure 20:
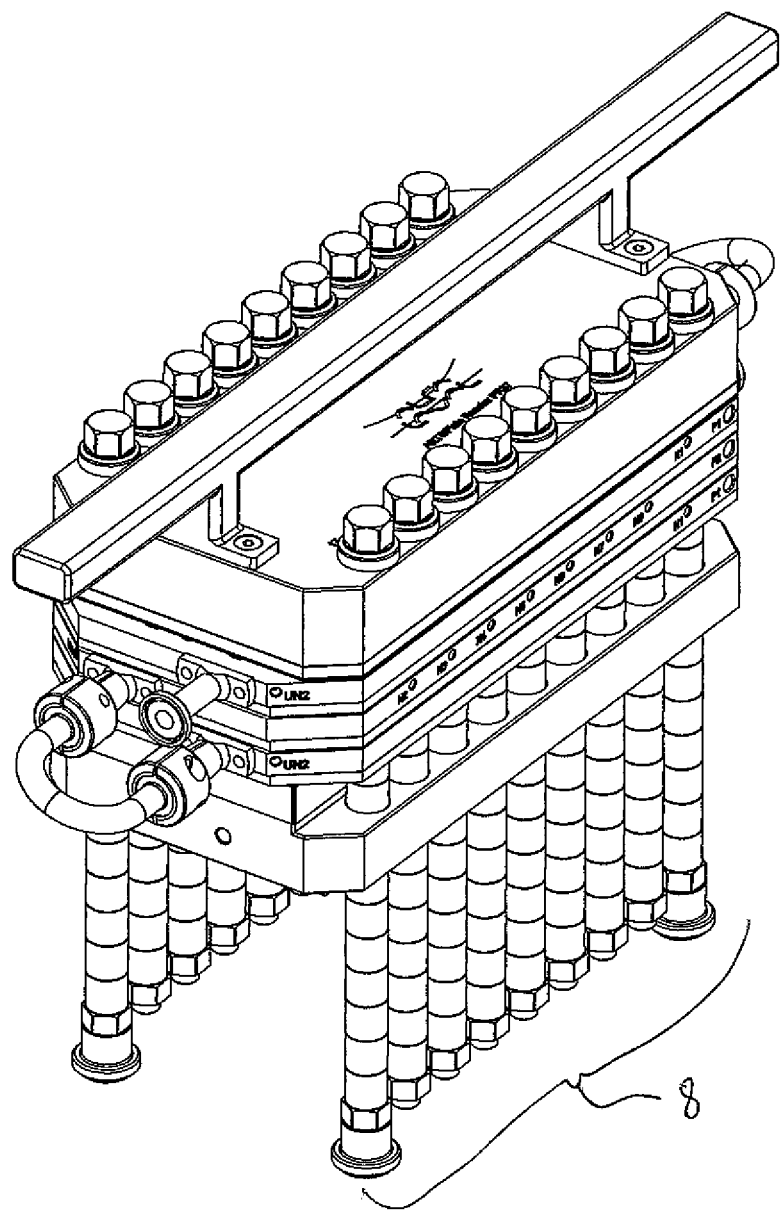
FIG. 20 illustrates a closed flow module or a closed reactor according to one alternative of the invention.

As shown in FIG. 7, the clamping system 80 includes a first end plate 2 and a second end plate 7. The clamping system 80 is shown having two tension rods 8 extending between the first end plate 2 and the second end plate 7. In one embodiment, the two tension rods 8 position the first end plate 2 at a predetermined clamping distance A from the second end plate 7, similar to that described above with reference to FIG. 4. One end of one of the tension rods 8 is positioned proximate an edge 2A of the first end plate 2 and an opposing end of the tension rod 8 is positioned proximate an edge 7A of the second end plate 7. One end of the other of the tension rods 8 is positioned proximate an edge 2B of the first end plate 2 and an opposing end of the tension rod 8 is positioned proximate an edge 7B of the second end plate 7. While, two tension rods 8 are shown and described, the present invention is not limited in this regard as any number of tension tods may be employed, for example, but not limited to nine tension rods as shown in FIG. 20.

As shown in FIG. 7, six modules 6 are disposed between the first end plate 2 and the second end plate 7. As described herein, the modules 6 include any number of modules including one or more flow module plates, one or more reactor plates, one or more heat exchanger plates or combinations thereof.

Figure 21:
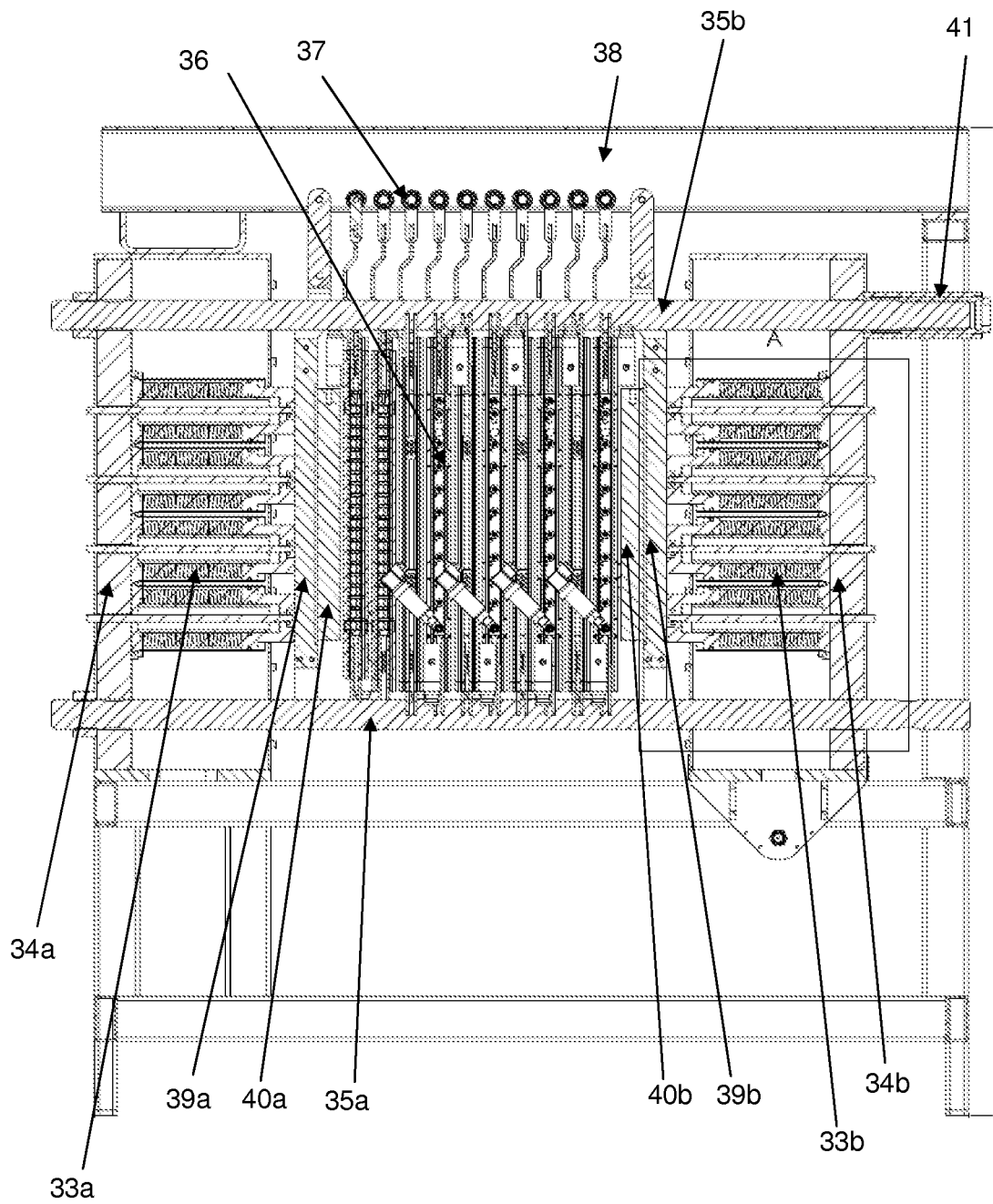
FIG. 21 illustrates a closed clamping system having module plates clamped between pressure plates.

The clamping system 80 of FIG. 7 has a first grid 1 of four rows of first spring piles 1A and any number of columns of first spring piles 1A. For example, the first grid 1 is a 3×7 grid as shown and described herein with reference to FIG. 2 or the first grid 1 may be a 1×4 grid as shown in FIG. 21. Each of the first spring piles 1A is defined by a plurality of first disc springs 1C, for example as shown in FIGS. 1, 3 and 7. The first grid 1 of the first spring piles 1A is positioned between the first end plate 2 and the second end plate 7. The first grid 1 of the first spring piles 1A is positioned laterally inward from the tension rods 8 in the direction of the arrows M, as shown in FIG. 7.

Figure 13:
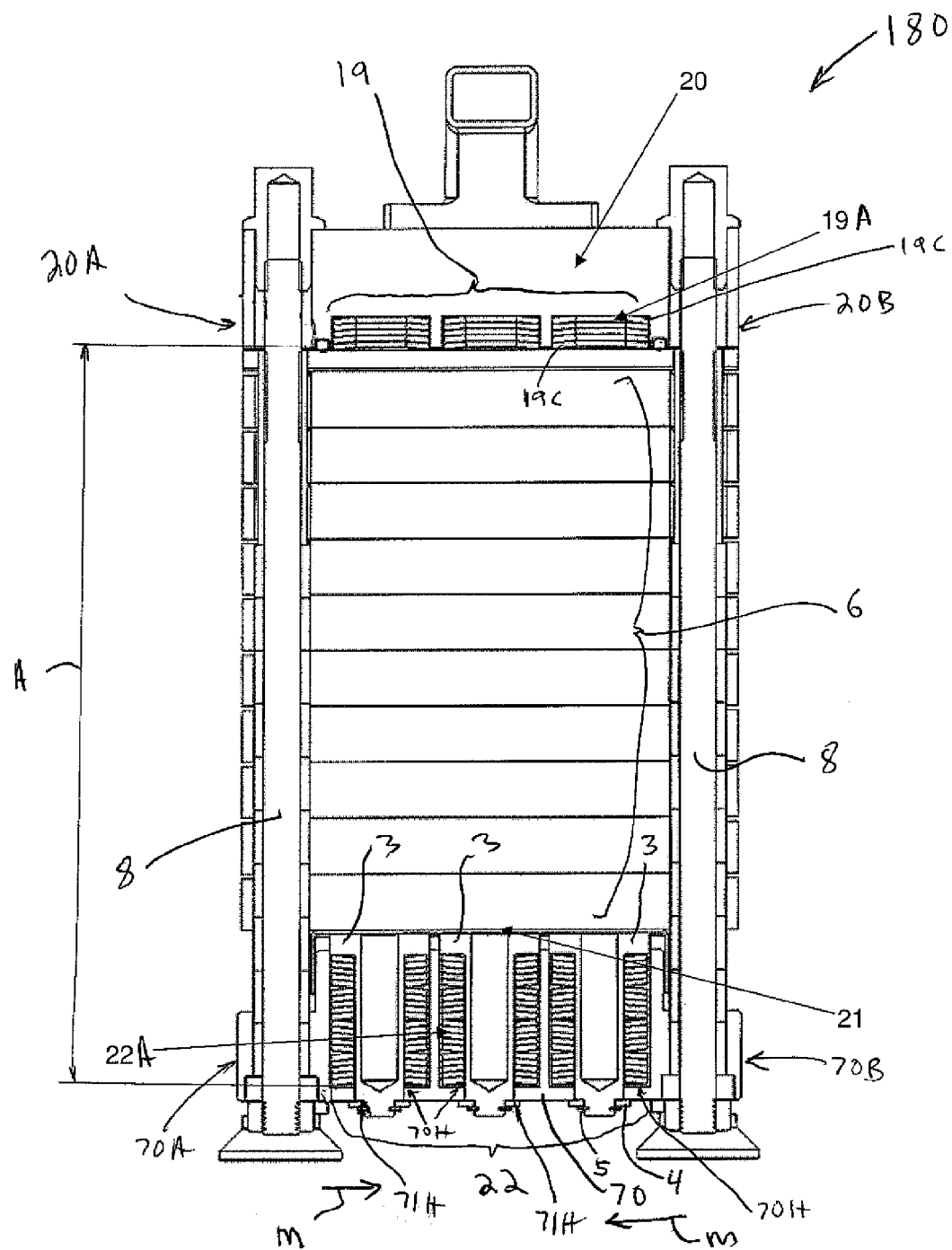
FIG. 13 illustrates a cross section view of a clamping system having two grids of springs.
Figure 14:
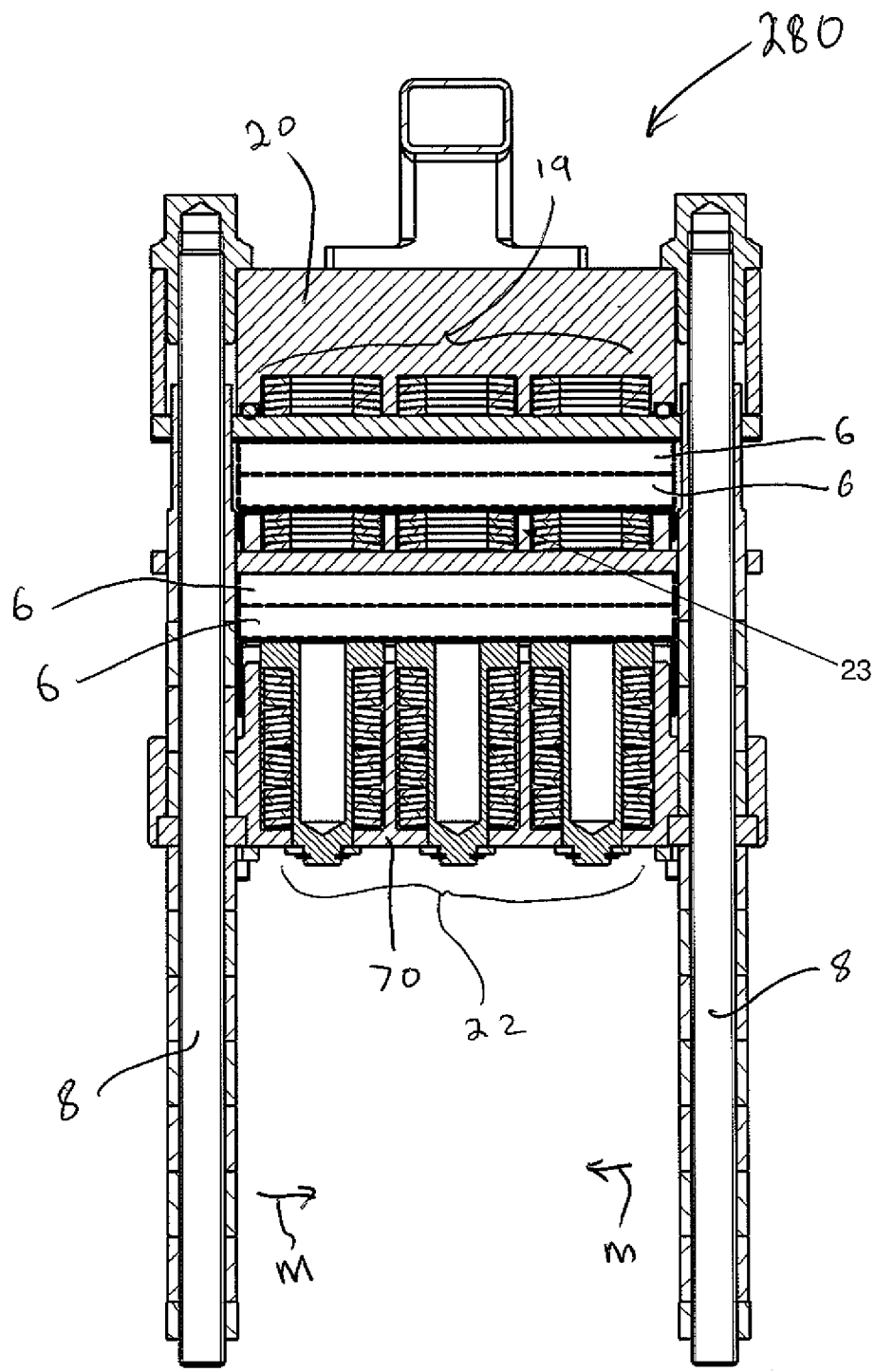
FIG. 14 illustrates a cross view of a clamping system having three grids of springs

While the clamping system 80 is shown and described as having a first grid 1 of spring piles, the present invention is not limited in this regard as any number of grids of spring piles may be employed, such as two grids of spring piles as shown in FIG. 13 or three grids of spring piles as shown in FIG. 14.

Figure 11:
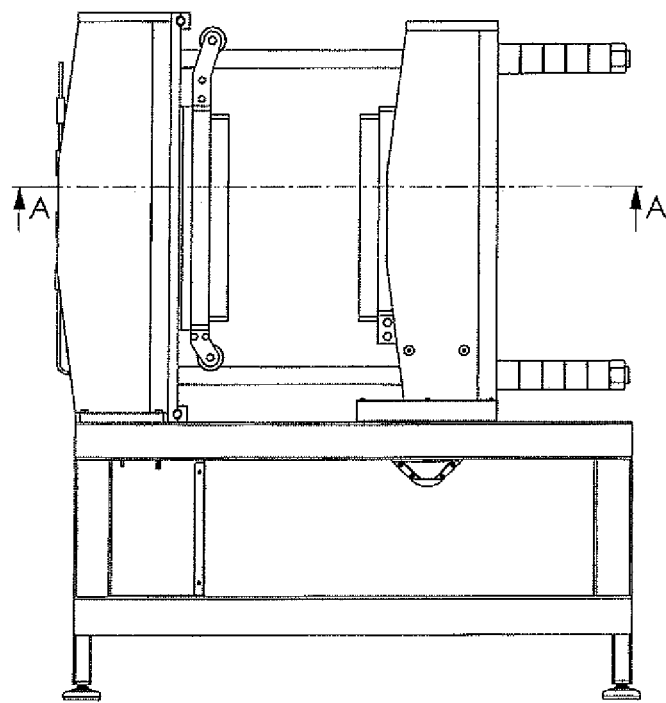
FIG. 11 illustrates a side section view of a closed reactor frame without any clamped plates with a section A-A.
Figure 12:
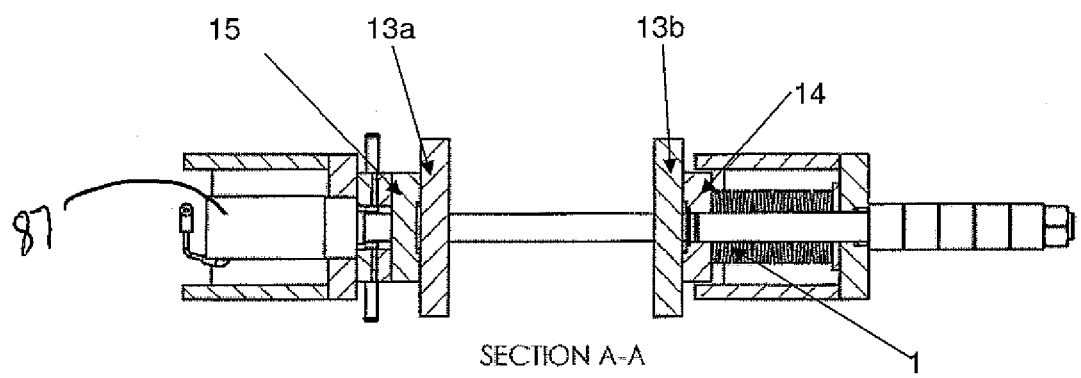
FIG. 12 shows section A-A of FIG. 11.

FIG. 11 is showing a side section view of the frame with distance blocks in closed position behind distribution plate 15. The figure is showing a cross-section line A-A. Section A-A in FIG. 12 is the arrangement from FIG. 11 showing the frame and the grid of springs. FIG. 12 is showing how distribution plate 14 can move inside a house of the grid of springs depending on the force laid upon the pressure plate by the hydraulic cylinders. Since there is no reactor plates or no flow module plates in this figure there is no force on the piles of disc springs, which result in that pistons 3 are in level with the outer side of end plate 2. If there are forces from the springs or the hydraulic cylinders the forces are redistributed by means of pressure distribution plates 14 and 15. The redistribution can be done by adding or removing material to define the contact pattern in the interface between the pressure plate and the pressure distribution plate, 13a and 15, 13b and 14 respectively. In this case a vertical groove is milled in the pressure distribution plates in all its length, creating two vertical lines of contact.

FIG. 13 is showing a second grid of springs 19 on the second end plate 20, which is placed opposite the first end plate. A cover plate 21 is covering the first grid of springs 22 at the first end plate that any fluids should be kept out of the first grid of springs. In FIG. 14 a spacer plate 23 inserted between two reactor plates or two flow module plates. Any number of spacer plates 23 can be inserted between plates or between stacks of plates. This makes it possible to expand the number of plates which could be included in a plate reactor or in a flow module.

The clamping system 180 of FIG. 13 is similar to that of FIG. 7. For example, the clamping system 180 includes a first end plate 70 and a second end plate 20. The clamping system 180 is shown having two tension rods 8 extending between the first end plate 70 and the second end plate 20. The two tension rods 8 position the first end plate 20 at a predetermined clamping distance A from the second end plate 20, similar to that described above with reference to FIG. 4. One end of one of the tension rods 8 is positioned proximate an edge 70A of the first end plate 70 and an opposing end of the tension rod 8 is positioned proximate an edge 20A of the second end plate 20. One end of the other of the tension rods 8 is positioned proximate an edge 70B of the first end plate 70 and an opposing end of the tension rod 8 is positioned proximate an edge 20B of the second end plate 20. While, two tension rods 8 are shown and described, the present invention is not limited in this regard as any number of tension tods may be employed, for example, but not limited to nine tension rods as shown in FIG. 20.

The clamping system 180 of FIG. 13 has a first grid 22 of three rows of first spring piles 22A and any number of columns of first spring piles 22A. For example, the first grid 22 is a 3×7 grid as shown and described herein with reference to FIG. 2 or the first grid 1 may be a 1×4 grid as shown in FIG. 21. Each of the first spring piles 22A is defined by a plurality of first disc springs 22C, for example as shown in FIGS. 1, 3, 7 and 13. The first grid 22 of the first spring piles 22A is positioned between the first end plate 70 and the second end plate 20. The first grid 22 of the first spring piles 22A is positioned laterally inward from the tension rods 8 in the direction of the arrows M, as shown in FIG. 13.

As shown in FIG. 13, ten flow modules 6 are disposed between the first end plate 70 and the second end plate 20.

The clamping system 180 of FIG. 13 has a second grid 19 of a plurality of second spring piles 19A, each of the plurality of second spring piles 19A being defined by a plurality of second disc springs 19C. The second grid 19 of t the second spring piles 19A is positioned between the first end plate 70 and the second end plate 20. The second grid 19 of the second spring piles 19A is positioned laterally inward from the tension rods 8 in the direction of the arrows M. When in the clamping system 180 is in the closed position (see for example FIGS. 5, 10 and 21), the tension rods 8 distribute tension forces to the first spring piles 22A and the plurality of second spring piles 19A.

In one embodiment, the clamping system 180 includes a distribution plate 15 positioned between the first end plate 2 and the second end plate 7, as shown in FIG. 7. While one distribution plate 15 is shown and described, the present invention is not limited in this regard as more than one distribution plate may be employed, for example two distribution plates 39a and 39b, as shown in FIG. 21.

In one embodiment, the clamping position 180 includes two distance blocks 16 that each are defined by a narrow rectangular strip having a raised step portion 16R projecting inwardly therefrom. The distance blocks 16 are moveably mounted at one end on a first pin 83A and on an opposing end on a second pin 83B. The first pin 83A and the second pin 83B are secured to the second end plate 7, as illustrated in FIGS. 7-9. In FIGS. 7 and 8, the distance blocks 16 are shown in a laterally outermost position as indicated by the arrows N, thereby defining an open or unclamped position of the distance blocks 16. In the open or unclamped position, the distance blocks 16 are positioned laterally outward of and aligned with opposing edges 15A a and 15B of the distribution plate 15.

The distance blocks 16 are laterally moveable from the open or unclamped position (FIGS. 7 and 8) in the direction indicated by the arrows M (FIG. 9) to a laterally innermost position, thereby defining a closed or clamped position of the distance blocks. In the closed or clamped position illustrated in FIG. 9, the distance blocks 16 are positioned behind the distribution plate 15 so that the raised step portion 16R engages an axially outward facing surface 15C of the distribution plate 15, as shown in FIG. 9.

Figure 15:
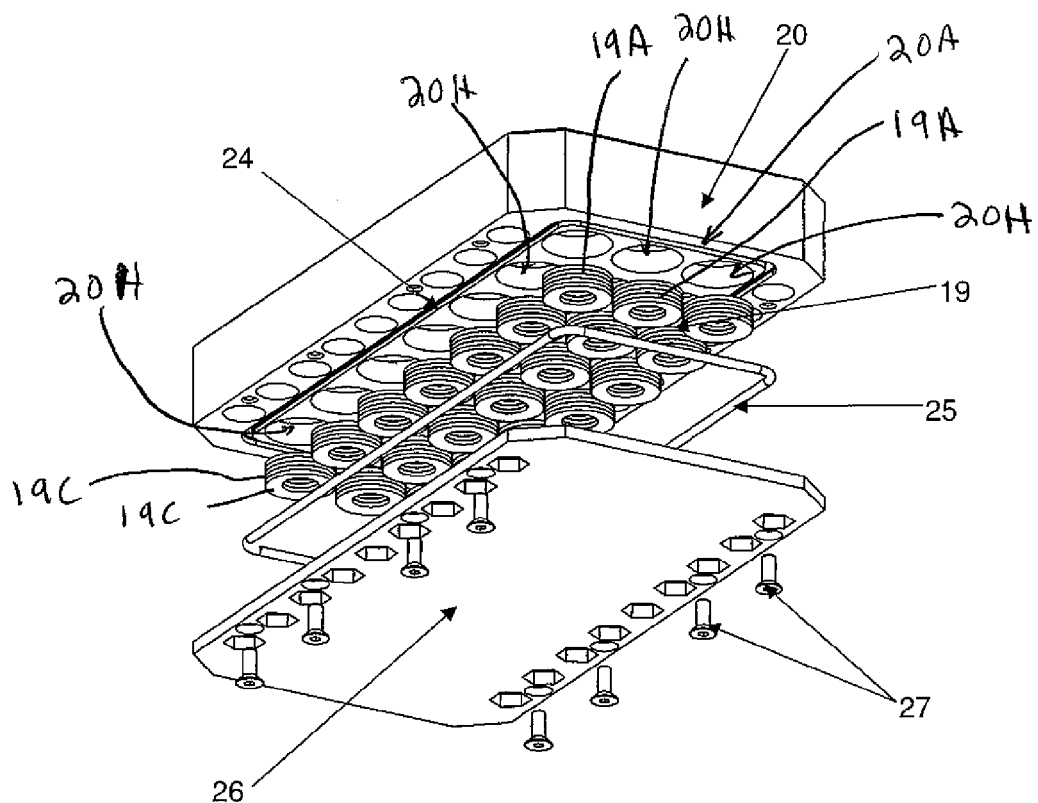
FIG. 15 illustrates a second end plate having a second grid of springs according to the invention.

FIG. 15 is showing a second end plate 20 having a second grid of springs 19 in this figure the second grid of springs is composed of piles of disc springs placed in holes in the second end plate according to one alternative of the invention. The figure shows a cut-out portion 24 or a groove 24 in which a gasket 25 or a seal 25 could be placed for the purpose of sealing or tightening the area or the space formed between second end plate 20 and flex plate 26. Screws 27 are positioning the flex plate to the second end plate, but leaving space for spring travel.

Figure 16:
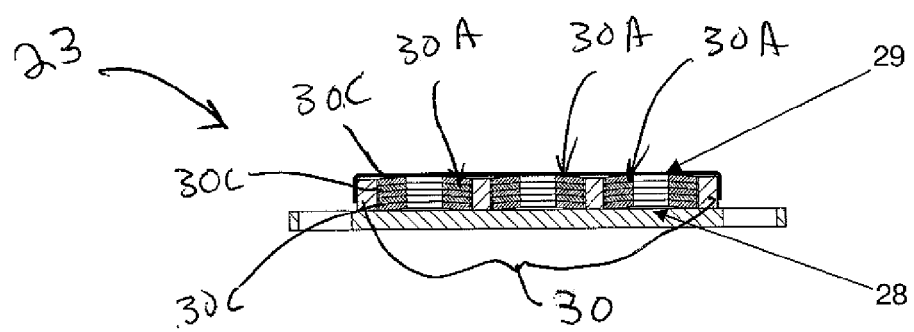
FIG. 16 illustrates a cross section view of a spacer plate according to the invention.
Figure 17:
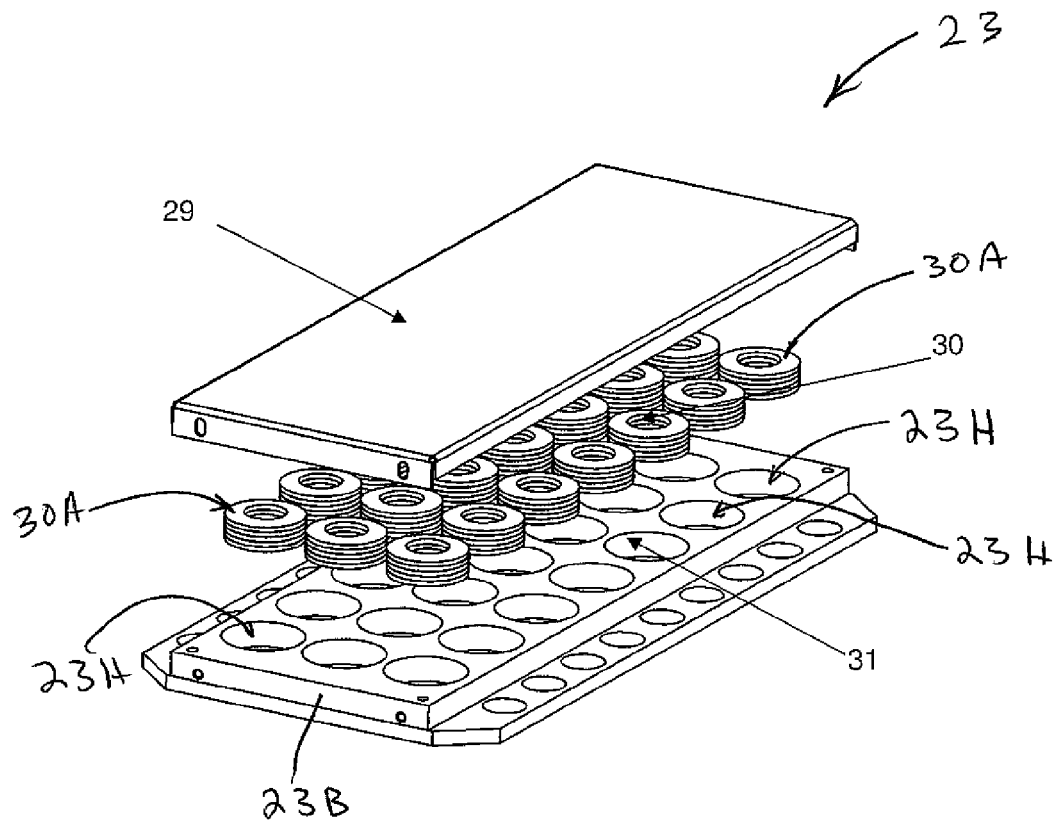
FIG. 17 illustrates another view of the spacer plate of FIG. 16.
Figure 18:
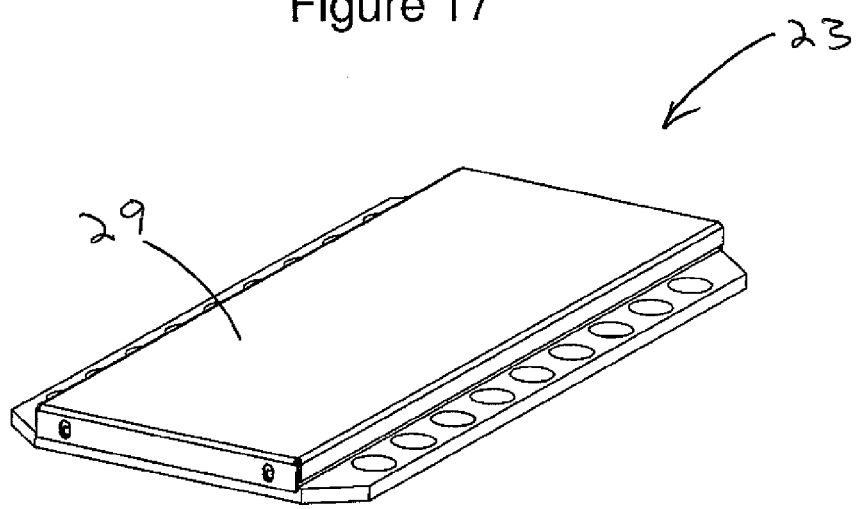
FIG. 18 illustrates another view of the spacer plate of FIG. 16.

FIGS. 16, 17 and 18 are showing a spacer plate 28 having a cover plate 29 covering a grid of springs 30. The grid of springs in these figures is piles of disc springs which are place in holes 31 to hold the piles in place.

Referring to FIG. 15, the second end plate 20 has a recess 20A defined by twenty one holes 20H that extend partially into the second end plate 20. The holes 20H are arranged in a 3×7 grid and receive the second grid 19 of the second spring piles 19A therein. A flex plate 26 is moveably secured to the second end plate 20 by a plurality of screws 27 as described further herein. The flex plate 27 covers the recess 20A and the second grid of the plurality of second spring piles.

Referring to FIGS. 14-18, the clamping system 280 includes a spacer plate 23 disposed between two flow modules 6. The spacer plate 23 includes base plate 23B having twenty one holes 23H extending partially therethrough. The holes 23H are arranged in a 3×7 grid. The spacer plate 23 includes a third grid 30 of third spring piles 30A arranged in a 3×7 grid. Each of the third spring piles 30A is defined by a plurality of third disc springs 30C. Each of the third spring piles 30A is disposed in one of the holes 23H. The third grid of the plurality of third spring piles being positioned laterally inward from the tension rods 8 in the direction of the arrows M as shown in FIG. 14. The spacer plate 23 includes a cover 29 moveably positioned on the base plate 23B over the third plurality of third spring piles 30A.

Referring to FIGS. 13 and 14, the clamping systems 180 and 280 have the first end plate 70 configured similar to that shown and described herein with reference to FIG. 1. The first end plate 70 has a plurality of first holes 70H extending partially therethrough and a plurality of second holes 71H extending therethrough. Each of the plurality of second holes 71H is concentric with and positioned within the respective one of the first hole 70H. A plurality of first shafts, for example pistons 3 moveably extending into respective ones of the first holes 70H and through respective ones of the second holes 71H. Each piston 3 has a T-shaped head 3H. Each of the plurality of first spring piles 22A is mounted on a respective one of the pistons 3 and is compressed between the T-shaped head 3H and the first end plate 70. The pistons 3 are arranged to axially move in the first holes 70H in response to compression and/or expansion of the first spring plies 22A. Such axial movement is limited by a washer 4 and a retaining ring 5 secured to each of the pistons 3 on an axially outward portion of the pistons 3.

Referring to FIGS. 7 and 8 the tension rods are modular, in that the tension rods 8 include sleeves 17 positioned on the tension rods 8 and secured thereon by nuts 18. Thus the distance between the first end plate 70 and the second end plate 20 may be adjusted by choosing the number of sleeves 17.

Referring to FIG. 12, the clamping system 180 includes an actuator, for example a motor 87 in communication with the tension rods 8and for driving the tension rods 8. While a motor is shown and described, the present invention is not limited in this regard as other actuators may be employed including but not limited to a hydraulic actuator.

In one embodiment, the clamping system 180 includes a pressure plate 13a disposed between the first end plate 2 and one of the modules 6. The pressure plate 13a engages the distribution plate 15 and one of the modules 6. Another pressure plate 13b is disposed between the second end plate 7 and another module 6. The pressure plate 13b engages one of the modules 6 and the distribution plate 14.

Figure 19:
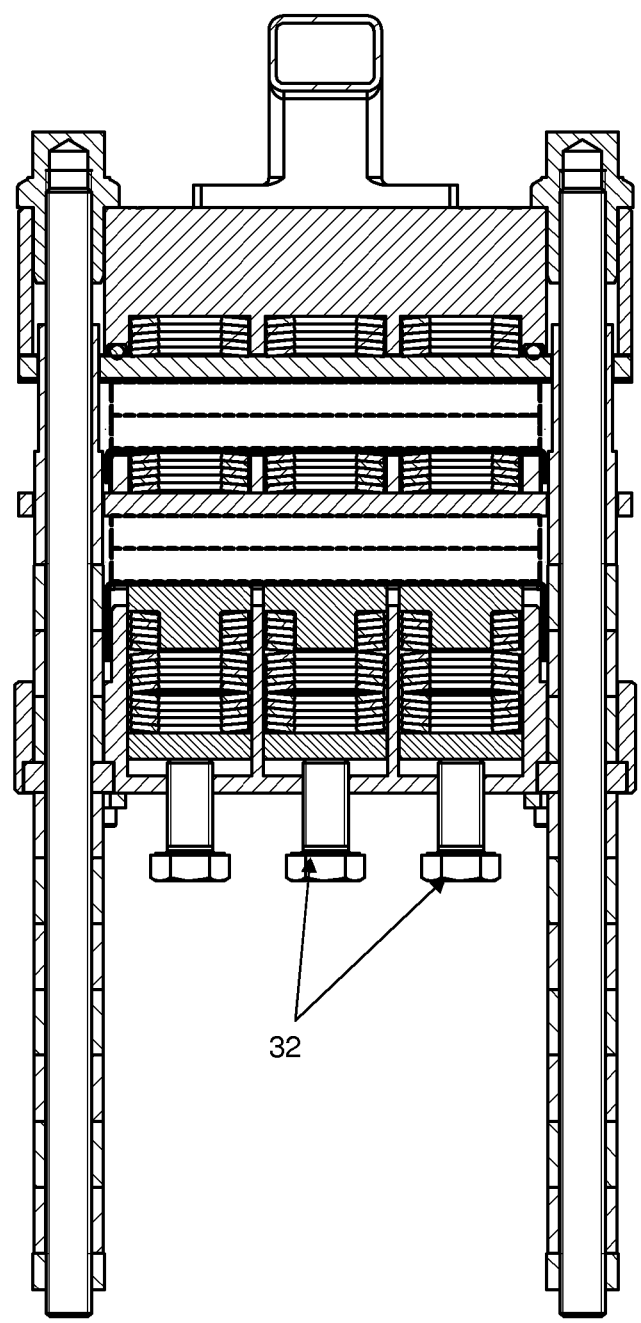
FIG. 19 illustrates a cross section view of an alternative arrangement of the first grid of springs on the first end plate.

FIG. 19 is showing an alternative arrangement of the first grid of springs in the first end plate. In this figure piston 3 is cut-off. The cut-off part of piston 3, washer 4 and retaining ring 5 (see FIG. 1) are replaced by a rigid washer and screw 32. One or more screws 32 may be tensioning the piles of disc springs on the first end plate according to one alternative of the invention after tightening the tension rods.

FIG. 20 is showing a 3D view of a plate reactor or a flow module. In this figure is the plate reactor or the flow module closed and the grids of springs can not be seen in this figure since they are covered by the end plates and the cover plates.

FIG. 21 is showing an assembled flow module according to the invention having two grids of springs 33a and 33b arranged in two end plates 34a and 34b. In this figure the hydraulic tools such as hydraulic cylinders or hydraulic actuators are not shown. In some applications the hydraulic tools may be removed. Tension rods 35a and 35b are holding flow plates 36 or reactor plates 36 of the flow module into place in horizontal position when the flow module is clamped. FIG. 21 is also showing how flow plates 36 are hold in positions by holding means 37 which are hanging from a beam 38. Distribution plates 39a and 39b are distributing the forces to pressure plates 40a and 40b. Between the distribution plates and the pressure plates may material be added or removed to define a contact pattern in the interface between the pressure plate and the distribution plate, the pattern could be two or more parallel longitudal areas, this is not shown in the figure. Clamp nuts 41 are tightening the tension rods in this figure but any tightening means are possible.

EXAMPLE 1

For example could a stack of ten reactor plates according to one alternative have a total dimensional variation of $L2-L1=0.6$ mm over a temperature range from about $-40°$ C. to about $200°$ C. By using a grid of tuned spring piles the forces could be held within limits for each pile, which in this case was between $F1=12$ kN and $F2=28$ kN, (kN=kilo Newton).

A plate reactor or a flow module comprise of a frame where a stack of reactor plates are clamped together in between two end plates. Each reactor plate or flow plate may be closed with a gasket or a seal and the forces that acting on the gasket or the seal are the same as the clamping force. The challenge in designing a plate reactor or a flow module is to distribute the clamping force over the entire face of the gasket or the seal to form a tight seal. There are a number of problems that must be dealt with:

1. Geometric discrepancies, such as flatness of end plates and thickness of each reactor plate
2. Accumulated systematic, geometric discrepancies, such as thickness of each plate
3. Temperature expansion difference between reactor plates, gaskets, seals, bolts, tension rods, etc.
4. Temperature transients in end plates may also be a problem. A hot surface on one side and a cool surface on the other will result in bended end plates.
5. Temperature transients in reactor plates or flow plates may result in thickness differences.

A Winkler bed or a grid of springs in the bottom end plate works up to a maximum number of plates. The contact force distribution on the gasket faces will get worse farther away from the Winkler bed and eventually result in leakage. A solution to the problems are solved by the present invention. Beside the function of a Winkler bed, may the springs slow down the temperature transient due to the fact that they transfer heat poorly with their small contact surfaces and many interfaces. The addition of spacer spring plates in the stack may allow to increasing the maximum number of plates. The additional spacer spring plates work both as an insulator and as a Winkler bed. To get a better insulating plate the springs can be replaced by insulating washers, like ceramic washers, to reduce heat transport between reactor plates and/or end plates.

What is claimed is:

1. A clamping system comprising:
   a first end plate;
   a second end plate;
   at least two tension rods extending between the first end plate and the second end plate, the at least two tension rods being located proximate each edge of each of the first end plate and the second end plate;
   at least one module disposed between the first end plate and the second end plate, the module comprising one or more flow module plates, one or more reactor plates, one or more heat exchanger plates or combinations thereof;
   a first grid of a plurality of first spring piles, each of the plurality of first spring piles being defined by a plurality of first disc springs, the first grid of the plurality of first spring piles being positioned between the first end plate and the second end plate, and the first grid of the plurality of first spring piles being positioned laterally inward from the at least two tension rods; and
   a second grid of a plurality of second spring piles, each of the plurality of second spring piles being defined by a plurality of second disc springs, the second grid of the plurality of second spring piles being positioned between the first end plate and the second end plate, and the second grid of the plurality of second spring piles being positioned laterally inward from the at least two tension rods;

when in the clamping system is in the closed position, the tension rods distribute tension forces to the plurality of first spring piles and the plurality of second spring piles.

2. The clamping system according to claim 1, further comprising:
at least one distribution plate positioned between the first end plate and the second end plate; and
at least one distance block, the at least one distance block being selectively and moveably positionable between:
an open position in which the at least one distance block is positioned laterally outward from an edge of the at least one distribution plate; and
a closed position in which the at least one distance block is positioned laterally inward from the edge of the at least one distribution plate.

3. The clamping system according to claim 1, wherein the second end plate further comprises a recess in which the second grid of the plurality of second spring piles is disposed, a flex plate is moveably secured to the second end plate and covering the recess and the second grid of the plurality of second spring piles.

4. The clamping system according to claim 1, wherein the at least one flow module comprises at least two flow modules the clamping system further comprising:
a spacer disposed between two of the at least two flow modules, the spacer comprising:
a base plate having a plurality of holes extending partially therethrough;
a third grid of a plurality of third spring piles, each of the plurality of third spring piles being defined by a plurality of third disc springs, each of the third spring piles being disposed in one of the plurality of holes, and the third grid of the plurality of third spring piles being positioned radially inward from the at least two tension rods; and
a cover moveably positioned on the base plate over the third plurality of third spring piles.

5. The clamping system according to claim 1, wherein the first end plate has a plurality of first holes extending partially therethrough, a plurality of first shafts each having a T-shaped head, one of the plurality of first shafts extending through a respective one of the plurality of first holes, and each of the plurality of first spring piles being mounted on a respective one of the plurality the first shafts and compressed between the T-shaped head and the first end plate.

6. The clamping system according to claim 1, wherein the tension rods have one of a fixed length and a modular length.

7. The clamping system according to claim 6, further comprising an actuator further comprising one of a motor and a hydraulic actuator and wherein the tension rods are driven by the motor or the hydraulic actuator.

8. A clamping system comprising:
a first end plate;
a second end plate;
at least two tension rods extending between the first end plate and the second end plate, one of the at least two tension rods being located proximate each of two edges of each of the first end plate and the second end plate;
at least two flow modules disposed between the first end plate and the second end plate;
a first grid of a plurality of first spring piles, each of the plurality of first spring piles being defined by a plurality of first disc springs, the first grid of the plurality of first spring piles being positioned between the first end plate and the second end plate, and the first grid of the plurality of first spring piles being positioned laterally inward from the at least two tension rods;
a second grid of a plurality of second spring piles, each of the plurality of second spring piles being defined by a plurality of second disc springs, the second grid of the plurality of second spring piles being positioned between the first end plate and the second end plate, and the second grid of the plurality of second spring piles being positioned laterally inward from the at least two tension rods;
when in the clamping system is in the closed position, the tension rods distribute tension forces to the plurality of first spring piles and the plurality of second spring piles;
at least one distribution plate positioned between the first end plate and the second end plate;
a spacer disposed between two of the at least two flow modules, the spacer comprising:
a base plate having a plurality of holes extending partially therethrough;
a third grid of a plurality of third spring piles, each of the plurality of third spring piles being defined by a plurality of third disc springs, each of the third spring piles being disposed in one of the plurality of holes, and the third grid of the plurality of third spring piles being positioned radially inward from the at least two tension rods; and
a cover moveably positioned on the base plate over the third plurality of third spring pile; and
at least one pressure plate disposed between at least one of:
the first end plate and one of the at least two flow modules; and
the second end plate and another of the at least two flow modules.

9. A clamping system according to claim 8, further comprising:
at least two distance blocks, the at least two distance blocks being selectively and moveably positionable between:
an open position in which the at least two distance blocks are positioned laterally outward from an edge of the at least one distribution plate;
a closed position in which the at least two distance blocks are positioned laterally inward from the edge of the at least one distribution plate.

10. The clamping system according to claim 8, wherein:
the first end plate has a plurality of first holes extending partially therethrough and a plurality of second holes, each being concentric with respective ones of the plurality of first holes;
a plurality of shafts each having a T-shaped head, one of the plurality of shafts extending into a respective one of the plurality of first holes and through a respective one of the plurality of second holes;
each of the plurality of first spring piles being mounted on a respective one of the plurality the shafts and compressed between the T-shaped head and the first end plate; and
each of the plurality of shafts having axial movement in the respective one of the plurality of second holes by a first washer and first retaining ring disposed on a distal end thereof.

11. A frame arrangement for holding a flow module or reactor plate, the frame arrangement comprising:
a first end plate;
a second end plate;
at least two tension rods extending between the first end plate and the second end plate, one of the at least two tension rods being located proximate each of two edges of each of the first end plate and the second end plate;

at least two flow modules disposed between the first end plate and the second end plate;

a first grid of a plurality of first spring piles, each of the plurality of first spring piles being defined by a plurality of first disc springs, the first grid of the plurality of first spring piles being positioned between the first end plate and the second end plate, and the first grid of the plurality of first spring piles being positioned laterally inward from the at least two tension rods;

a second grid of a plurality of second spring piles, each of the plurality of second spring piles being defined by a plurality of second disc springs, the second grid of the plurality of second spring piles being positioned between the first end plate and the second end plate, and the second grid of the plurality of second spring piles being positioned laterally inward from the at least two tension rods;

the tension rods distribute tension forces to the plurality of first spring piles and the plurality of second spring piles when the clamping system is in a closed position;

at least two distribution plates positioned between the first end plate and the second end plate;

a first pressure plate disposed between the first end plate and one of the at least two flow modules; and a second pressure plate disposed between the second end plate and another of the at least two flow modules.

12. The frame arrangement of claim 11, wherein a vertical groove is milled in at least one of the at least two distribution plates and the pressure plates thereby creating two vertical lines of contact along a length defined by each of the at least two distribution plates.

13. The clamping system according to claim 2, further comprising a pressure plate positioned between the distribution plate and the at least one flow module.

14. The lamping system according to claim 1, wherein the at least two tension rods position the first end plate at a predetermined clamping distance from the second end plate.

15. The lamping system according to claim 8, wherein the at least two tension rods position the first end plate at a predetermined clamping distance from the second end plate.

16. The lamping system according to claim 11, wherein the at least two tension rods position the first end plate at a predetermined clamping distance from the second end plate.

* * * * *